Nov. 25, 1941.  S. N. BOBO  2,263,715
ROAST HOLDING SPIT
Filed Oct. 12, 1940
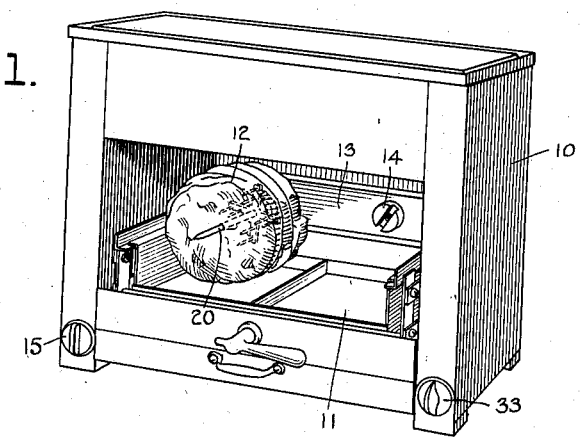
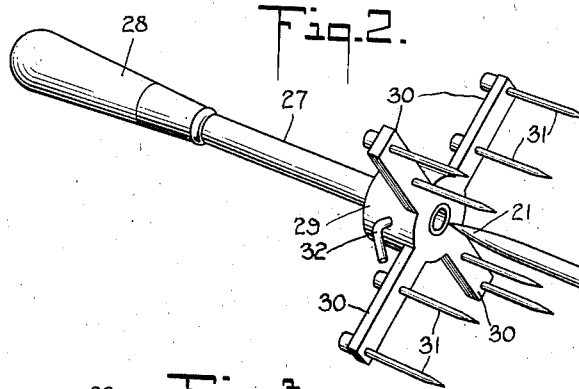
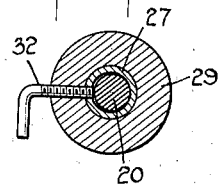
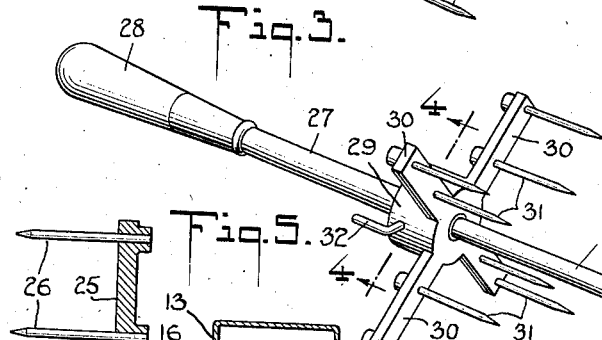
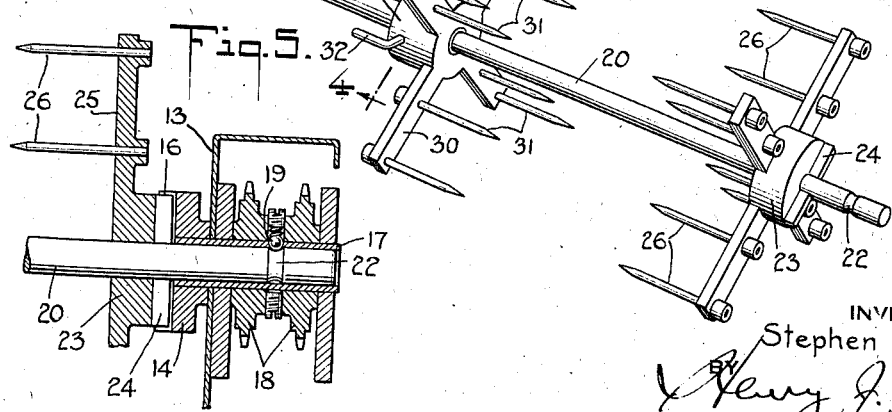
INVENTOR
Stephen N. Bobo
HIS ATTORNEY Patented Nov. 25, 1941

2,263,715

UNITED STATES PATENT OFFICE 2,263,715

ROAST HOLDING SPIT

Stephen N. Bobo, New York, N. Y.

Application October 12, 1940, Serial No. 360,955

4 Claims. (Cl. 53—5)

My present invention relates to food cooking apparatus, and more particularly to an improved roast holding spit.

In my copending application Serial No. 356,415, filed September 12, 1940, I have described and claimed an improved broiling or roasting apparatus in which the food to be broiled or roasted is mounted on a rotatable spit or spits.

My present invention is designed to be utilized in an apparatus such as that above referred to, and also is adapted to be used in any type of broiling or roasting apparatus wherein the food holding spit is rotatably mounted.

In carrying out my invention I provide a spit having means for attaching the same to the rotating apparatus, and associate with the spit devices on which the food to be roasted is impaled, a combined handle and impaling device which is adapted to be associated with the aforesaid spit for holding the food to roast firmly in position, while at the same time the entire device, together with the food thereon, may be carried to the device wherein the same is to be roasted or removed therefrom at will.

An object of my invention, therefore, is an improved food holding spit.

Another object of my invention is an improved combined food holding spit and handle therefor.

Other objects and novel features of the construction and arrangement of parts comprising my device will appear as the description of my invention progresses.

In the accompanying drawing illustrating a preferred embodiment of my invention, Fig. 1 is a perspective view of a broiler or roasting apparatus showing my present invention and in operative position therein.

Fig. 2 is a perspective exploded view illustrating the improved spit and associate handle.

Fig. 3 is a perspective view of the device illustrated in Fig. 2 and showing the spit and handle in assembled position.

Fig. 4 is a sectional end elevation on the line 4—4 of Fig. 3, and

Fig. 5 is a sectional view of a portion of the rotating mechanism of the broiling apparatus shown in Fig. 1 and illustrating the manner of connection of the spit with the spit-rotating means.

Referring to the drawing, 10 designates generally a broiler or roaster in which the heat radiating elements (not shown) are utilized to direct heat downwardly toward the bottom 11 of the device. The bottom 11 is the bottom of a roasting chamber in which the food 12 is to be placed, and the rear wall 13 of this chamber is provided with rotating clutch or connector mechanisms 14 rotatably driven from any suitable source of power (not shown). The source of power is controlled by a switch device 15 mounted on the front of the roaster or broiler 10.

Referring to Fig. 5, it will be noted that the clutch or connector mechanisms 14 are provided each with a transverse slot 16 in the face thereof and such mechanisms are mounted on a tubular member 17 which extends through the rear wall 13 of the roasting chamber. Mounted on such tubular members 17 are driving sprockets 18, while extending through the wall of the said tubular member 17 is a spring ball clutch 19 for a purpose to be hereinafter described.

Referring now to Figs. 2, 3 and 4, there is shown a spit shaft 20 sharpened at one end, as indicated by the reference numeral 21, and provided at the other end with a circumferential groove 22 which is adapted to cooperate with the spring ball clutch 19. The diameter of the spit shaft 20 is substantially equal to the internal diameter of the tubular member 17, so when the spit shaft 20 is pushed into the tubular member 17, as shown in Fig. 5, the spring ball clutch 19 will engage in the circumferential groove 22. A hub 23 has formed integral therewith at the rear face thereof a transverse bar 24 which is adapted to seat in the transverse slot 16 of the clutch or connector mechanism 14 when the spit shaft 20 is in the position shown in Fig. 5.

Secured to or formed integral with the hub 23 on the face thereof remote from the transverse bar 24 are radially extending arms 25 of any suitable dimensions as regards length, breadth and thickness, and each of such arms is provided with a plurality of pointed spit-like members 26. Such spit-like members 26 lie parallel with each other and with the spit shaft 20.

The structure thus far described in connection with Figs. 2, 3 and 5 is capable of use as a spit without any further associate apparatus, and for the sake of clarity, such device has been shown in Fig. 1 with the roast of meat 12 impaled thereon, and the device in association with a clutch or connector mechanism 14. Under a great many circumstances, however, it is advisable to have associated with the spit mechanism thus far described a mechanism which facilitates handling of the device and insures the operator against burns or soilage of clothing from handling roasted meats and the like.

The device referred to immediately above is shown in Figs. 2, 3 and 4, and referring to such figures there is shown a tubular combined sheath and handle 27. This sheath or handle member 27 is tubular and of any desired length and is adapted to be a sliding fit on the spit shaft 20. This sheath and handle member 27 is provided with a handle 28 of heat insulating material.

The end of the tubular combined sheath and handle 27 has secured thereto at the end remote from the handle 28 a hub 29, such hub being provided with a plurality of radially extending arms 30 preferably similar in size and number to the radially extending arms of the hub 23 and such radially extending arms are provided with spit-like members 31 which are arranged parallel with each other and parallel to the combined handle and sheath 27. Also, the spit-like members are similar in size and location to the spit-like members 26 on the hub 27. Extending through the hub 29 and through the tubular handle or sheath 27 is a set screw 32 which is utilized to hold the handle or sheath 27 in adjusted position along the length of the spit shaft 20.

In use the meat 12 to be roasted is impaled on the spit shaft 20 and forced onto the spit-like members 26. The tubular handle and sheath 27 is thereupon forced onto the spit shaft 20 by means of the handle 28, this operation forcing the spit-like members 31 into the roast 14 and holding the roast firmly between the radially extending elements 25 and 30 on the hubs 23 and 29, respectively. When in proper adjusted position the set screw 32 is operated to hold a tubular handle and sheath 27 on the spit shaft 20.

It will be apparent that with the roast 12 thus in position on the device illustrated in Figs. 2 and 3, the roast 12 may be brought to the roasting apparatus, the end of the spit shaft 20 passing into the tubular member 17 until the spring ball clutch 19 engages in the circumferential groove 22, whereupon the transverse bar 24 will be in register with the transverse slot 16 in the clutch and connector mechanism 14 and the device may be left in this position until the roasting operation is completed.

As stated above, the clutch or connector mechanism 14 are rotated by any suitable source of power controlled by the switch 15, and in like manner, heat, which is ordinarily obtained from gas, is controlled by a valve 33 mounted on the front of the roasting apparatus 10. When the roast of meat 12 is cooked the same may be easily removed from the roasting apparatus 10 by reversing the operation above described.

Whereas I have described my invention by reference to specific forms thereof, it will be understood that many changes and modifications may be made without departing from the spirit of the invention.

I claim:

1. An improved food holding spit for broilers comprising, a spit shaft on which food to be broiled is impaled, means on one end of the spit shaft for removably attaching the same to a rotatable holding means, a plurality of radially extending elements provided with spits mounted on said spit shaft but adjacent the last said end, and a sheath slidable over the end of the spit shaft and provided with a handle.

2. An improved food holding spit for broilers comprising a pointed spit shaft on which food to be broiled is impaled, means on one end of the spit shaft for removably attaching the same to a rotatable holding means, a plurality of radially extending elements mounted on said spit shaft but adjacent the last said end, a plurality of spits mounted on said elements, said plurality of spits lying parallel to each other and parallel to the spit shaft, a sheath slidably mounted over the pointed end of the spit shaft, a handle for said sheath whereby the same may be readily manipulated, and means for adjustably securing the sheath on said spit shaft.

3. An improved food holding spit for broilers comprising, a pointed spit shaft on which food to be broiled is impaled, means on one end of the spit shaft for removably attaching the same to a rotatable holding means, a plurality of radially extending elements mounted on said spit shaft but adjacent the last said end, a plurality of spits mounted on said elements, said plurality of spits lying parallel to each other and parallel to the spit shaft, a sheath slidable over the end of the spit shaft, a handle for said sheath, a hub on the sheath remote from the handle, means associated with the sheath for adjustably securing the sheath on the spit shaft, and a plurality of parallelly arranged spits carried by said hub.

4. An improved food holding spit for broilers comprising, a pointed spit shaft on which food to be broiled is impaled, means on one end of the spit shaft for removably attaching the same to a rotatable holding means, a plurality of radially extending elements mounted on said spit shaft but adjacent the last said end, a plurality of spits mounted on said elements, said plurality of spits lying parallel to each other and parallel to the spit shaft, a sheath adapted to be slidably mounted on the spit shaft, a handle for said sheath, a hub on the sheath remote from the handle, means associated with the sheath for adjustably securing the sheath on the spit shaft, a plurality of radially extending arms on said hub, and a plurality of spits mounted on said radially extending arms and having the points thereof extending toward the spits carried by the arms on the first said hub.

STEPHEN N. BOBO.